(12) United States Patent  (10) Patent No.: US 8,387,303 B2
Abraham et al.  (45) Date of Patent: Mar. 5, 2013

(54) POWERED FISHING LURE WITH BUOYANT AND SUBMERSIBLE COMPONENTS IN ELECTRICAL COMMUNICATION

(75) Inventors: David Abraham, Westerville, OH (US); Gary E. Myers, New Albany, OH (US); Michael Johnson, Lithopolis, OH (US); Jamison Float, Westerville, OH (US); Richard D. Peters, Gahanna, OH (US); Robert J. Hayes, Westerville, OH (US)

(73) Assignee: Tada Lures LLC, Lewis Center, OH (US)

( * ) Notice: Subject to any disclaimer, the term of this patent is extended or adjusted under 35 U.S.C. 154(b) by 103 days.

(21) Appl. No.: 12/903,843

(22) Filed: Oct. 13, 2010

(65) Prior Publication Data

US 2011/0252689 A1   Oct. 20, 2011

Related U.S. Application Data

(60) Provisional application No. 61/253,385, filed on Oct. 20, 2009.

(51) Int. Cl.
*A01K 85/00* (2006.01)
(52) U.S. Cl. ............ 43/26.2; 43/43.11; 43/26.1
(58) Field of Classification Search ........... 43/17, 17.5, 43/17.6, 26.1, 26.2, 43.11
See application file for complete search history.

(56) References Cited

U.S. PATENT DOCUMENTS

| | | | | |
|---|---|---|---|---|
| 1,973,028 A * | 9/1934 | Thomas | ................... | 43/43.11 |
| 2,393,070 A * | 1/1946 | Saloun | .................. | 43/44.91 |
| 3,085,361 A * | 4/1963 | Rhodes | .................. | 43/26.2 |
| 3,168,790 A * | 2/1965 | Creasey | .................. | 43/43.11 |
| 3,425,151 A * | 2/1969 | Salfer | .................... | 43/43.11 |
| 3,832,797 A * | 9/1974 | Smedley | ................. | 43/43.11 |
| 3,835,572 A * | 9/1974 | Mounsey | ................ | 43/42.06 |
| 4,251,941 A * | 2/1981 | Howard | .................. | 43/43.11 |
| 4,461,114 A * | 7/1984 | Riead | .................... | 43/17.5 |
| 4,486,969 A * | 12/1984 | Swenson | ................. | 43/17 |
| 4,506,471 A | 3/1985 | Riead | | |
| 4,748,760 A * | 6/1988 | Widmer | ................... | 43/17 |
| 4,748,761 A * | 6/1988 | Machovina | .............. | 43/17 |
| 4,760,664 A * | 8/1988 | Amendola | ............... | 43/17.5 |
| 4,916,846 A * | 4/1990 | Pehm | .................... | 43/17.5 |
| 5,485,697 A * | 1/1996 | Watson et al. | .......... | 43/42.31 |
| 5,511,335 A * | 4/1996 | Langer | .................... | 43/4 |
| 5,557,878 A * | 9/1996 | Ross | ....................... | 43/43.11 |
| 5,819,465 A * | 10/1998 | Bryant | .................... | 43/16 |
| 5,875,582 A * | 3/1999 | Ratzlaff et al. | .......... | 43/26.1 |
| 6,122,852 A * | 9/2000 | Mechling, IV | ............ | 43/4 |
| 6,263,611 B1 * | 7/2001 | Kimura | .................. | 43/26.1 |
| 6,671,994 B1 * | 1/2004 | Klein | ..................... | 43/17 |
| 6,684,556 B1 * | 2/2004 | Arbuckle et al. | ......... | 43/17.1 |
| 6,880,285 B1 * | 4/2005 | Frost et al. | .............. | 43/15 |
| 7,131,231 B1 * | 11/2006 | Lee | ......................... | 43/17 |
| 7,225,583 B1 * | 6/2007 | Stacy et al. | ............. | 43/44.99 |
| 8,106,945 B2 * | 1/2012 | Tseng | .................... | 348/81 |
| 2006/0117639 A1 * | 6/2006 | Jones | .................... | 43/17 |
| 2008/0134564 A1 * | 6/2008 | Tseng | .................... | 43/17 |
| 2008/0289241 A1 * | 11/2008 | Hawryshyn et al. | ...... | 43/17.6 |
| 2011/0308136 A1 * | 12/2011 | Dragony | ................. | 43/43.11 |

* cited by examiner

*Primary Examiner* — Isam Alsomiri
*Assistant Examiner* — Michael A Fabula
(74) *Attorney, Agent, or Firm* — Standley Law Group LLP

(57) ABSTRACT

A fishing lure having a buoyant housing containing a power source and an electronic controlling element. A pair of conduction lines may connect the power source with a submersible module which contains an actuator, a means for propelling the submersible module through the water, and a hook. An elongate member or cable may also be used to connect the buoyant housing with the submersible module. A means for increasing/decreasing the length of conduction lines (and optional cable) between the buoyant housing and the submersible module may also be used. Some embodiments operate an electric motor with a propeller, fin, or tail. Some embodiments utilize contacts which may be bridged by water in order to energize the submersible module.

19 Claims, 6 Drawing Sheets

POWERED FISHING LURE WITH BUOYANT AND SUBMERSIBLE COMPONENTS IN ELECTRICAL COMMUNICATION

CROSS-REFERENCE TO RELATED APPLICATIONS

The present application claims priority to U.S. Application No. 61/253,385 filed on Oct. 20, 2009 and incorporated by reference as though fully re-written herein.

FIELD OF THE EXEMPLARY EMBODIMENTS

The exemplary embodiments herein are directed generally towards powered fishing lures.

BACKGROUND OF THE INVENTIVE FIELD

Fishing lures have been around for many years, and in the past have taken many forms, a typical lure having at least one fishing hook attached to something which might entice food or game fish (herein 'target fish') for attention and possibly to bite at. As most of these target fish are predatory in nature, lures most often take the form of some type of food for the target fish. Such lures may be configured as smaller fish, worms, frogs, or crayfish and are typically used by pulling the lure through the water (possibly with a jerking motion) to simulate a swimming fish, frog, etc. Other lure devices, such as spinners, spoons, poppers, etc., are constructed of shiny materials and designed to be dragged rapidly across the surface of a fishing area to simulate an injured or fleeing organism that might be good for a predatory fish to eat.

At least one problem with these lures of the past is that these are inanimate objects which rely on the skill of the fisherman pulling it through the water in order to catch the target fish's attention. Where a fisherman is inexperienced at dragging the lure through the water or where the conditions are not right for the fish to feed, then the fish simply will not bite at the lure. In other instances, the fish may become acclimated to lures, and learn to distinguish between a lure and food. As a result, there is a need for a lure that is more appealing to fish so as to cause them to bite even under sub-optimal conditions.

Some lures have been developed which house microcontrollers, power sources, motors, lights, and other electromechanical devices within the lure so that it might act in a more desirable and repeatable way once submersed and within the target fish's environment. Several problems have been discovered with these lures however. First, lures are typically very small and fitting each of the components into the envelope of the lure body can be difficult or impossible. Further, these sensitive electronic components can become damaged through handling or submersion, especially considering that lures are typically made of a softer material (sometimes an rubber, rubber-like plastic, or elastomer) which does not protect the internal components very well. Still further, the lures are often damaged by a target fish which may bite, tear, or even swallow the lure. When expensive microcontrollers and power sources are placed within the lure, they can easily be lost or damaged during a catch and can thus make fishing with these lures cost-prohibitive.

SUMMARY OF THE EXEMPLARY EMBODIMENTS

A preferred embodiment of the fishing lure uses a buoyant housing which may be used to contain the power source and electronic controls for a submersible module. The submersible module may contain some type of actuator and a hook. The power source and/or electronic controls may be in electrical communication with the electrical actuator through conduction lines or fluid lines. A cable may be used to connect the buoyant housing with the submersible module. A pair of contacts may be placed near the bottom of the buoyant housing and may function as a switch for energizing the electronic controls and submersible assembly when the contacts are bridged by water.

An exemplary actuator may be an electrical actuator which may include an electric motor which is surrounded by a plastic, elastomer, or any other typical lure encasement material. In some embodiments, a propeller may be attached to the motor shaft to provide a means for propelling the submersible module. The propeller may be located anywhere on the submersible module, preferably in the front or back. In other embodiments, the electrical actuator may provide a 'back and forth' motion similar to that of the tail of a fish.

The connections between the submersible module and the buoyant housing may be detachable so that a damaged submersible module can easily be replaced with a new one without having to replace the buoyant housing, power source, electronic controls, etc. This also allows different types of submersible modules and lengths of cable/connections to be used depending on the target fish and fishing conditions. An exemplary embodiment may utilize a means for varying the length of the cable/connections between the buoyant housing and submersible module.

In some embodiments, there may be multiple submersible modules attached to a single buoyant housing. The power source within the buoyant housing may comprise, but are no means limited to: capacitor, supercapacitor, button cell (or other types) of batteries, rechargeable cell battery, primary cell battery, or solar cell. The electronic controls within the buoyant housing may allow for several different types of electric actuator operation (i.e. constant, intermittent, speed-varying, etc.) depending upon the type of target fish being sought and the fishing conditions.

BRIEF DESCRIPTION OF THE DRAWINGS

In addition to the features mentioned above, other aspects of the exemplary embodiments will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

As used herein, an "actuator" is any device which converts an input energy into motion. As used herein, 'actuator' includes, but is not limited to: electric motors, pneumatic or hydraulic actuators, linear actuators, comb drives, piezoelectric actuators, bimetallic actuators, thermal bimorphs, and electroactive polymers. Thus, some embodiments are shown and described as using conduction lines with an electric actuator, including but not limited to: electric motors, linear actuators, comb drives, piezoelectric actuators, bimetallic actuators, thermal bimorphs, and electroactive polymers. Alternative embodiments may use fluid lines which transport some type of fluid for a pneumatic or hydraulic actuator. The various types of actuators shown and described herein can provide the means for propelling the submersible modules through the water.

Figure 1:
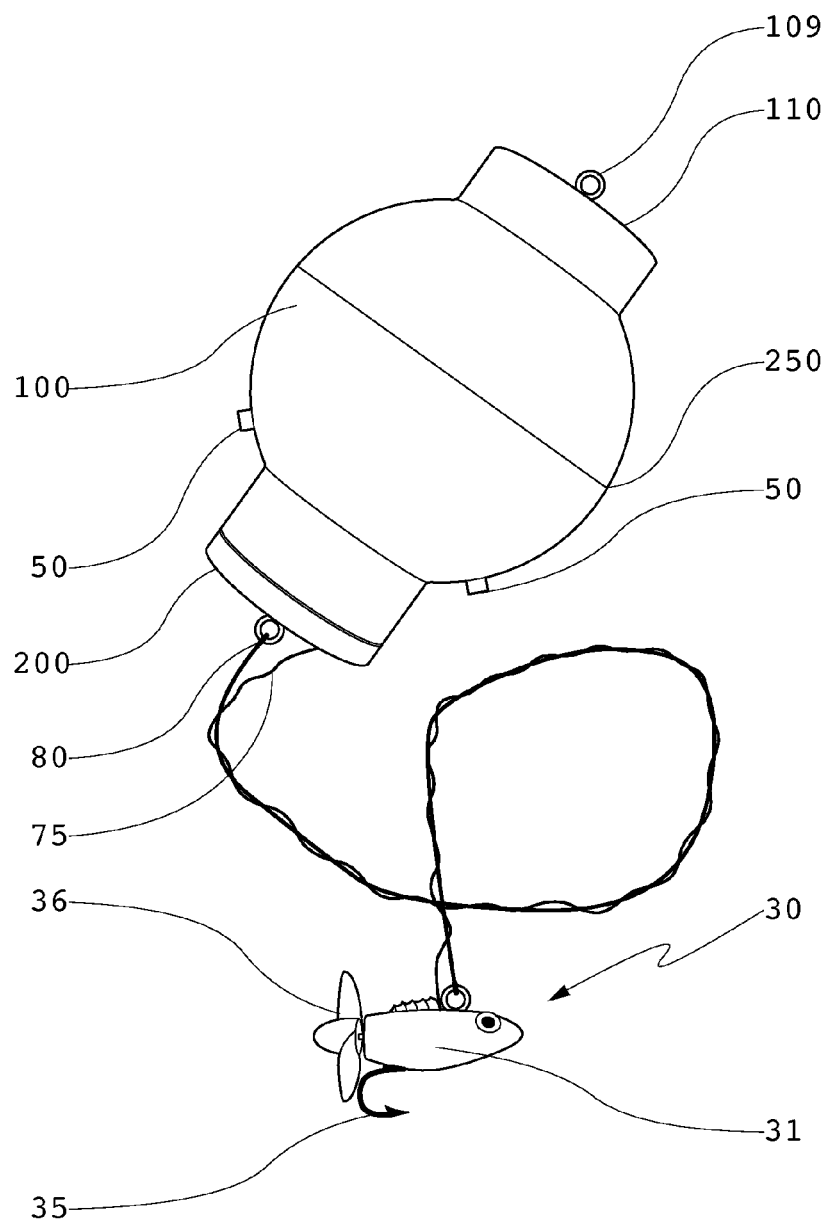
FIG. 1 is a side view of one embodiment of the buoyant housing and submersible module.
Figure 9A:
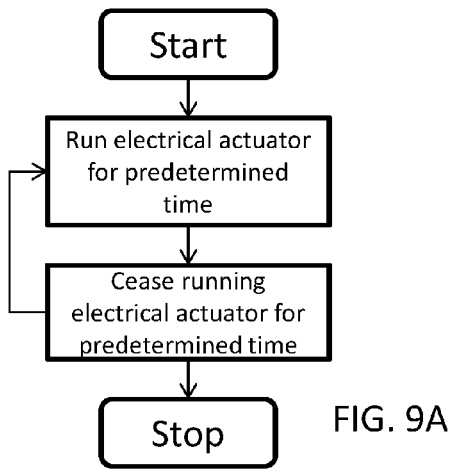
Figure 9B:
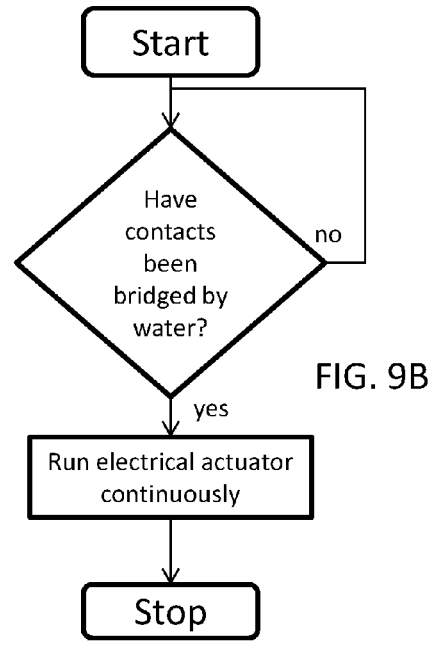

FIG. 1 provides an exemplary embodiment having a buoyant housing 100 and submersible module 30. The buoyant housing 100 may contain the power source 820 and electronic controls 825 for operating the submersible module 30. In a preferred embodiment, the buoyant housing 100 would be adequately sealed to prevent water from entering the buoyant housing 100. A pair of contacts 50 may be placed on the underside of the buoyant housing 100 so that when they are exposed to water, they can direct the power source and electronic controls to energize the submersible module 30. This feature may be used to conserve power (i.e. battery life) or to accurately control the behavior of the submersible module 30, or both. Thus, it may be desirable to have the submersible module 30 remain motionless immediately after entering the water and delay its movements until a certain amount of time has passed (see FIG. 9D). This technique may be used to avoid any drastic changes in the target fish's environment or allow the target fish to become comfortable with the submersible module's presence prior to any motion by the submersible module.

Electrical conduction lines 75 may provide electrical communication between the power source 820 and/or electronic controls 825 in the buoyant housing 100 and the submersible module 30. In some embodiments, the electrical conduction lines 75 may be insulated copper or aluminum wires. In some embodiments, the electrical conduction lines 75 are also the primary physical connection between the buoyant housing 100 and the submersible module 30. Thus, in these embodiments the electrical conduction lines 75 would also function as typical fishing line. However, in some embodiments, there may be an optional additional elongate member or cable 80 which is used to provide physical support to the electrical conduction lines 75. In these embodiments, the elongate member or cable 80 can be used to support the majority of the forces that are applied between the submersible module 30 and the buoyant housing 100 during casting and/or catching of a target fish. This may be used to prevent the electrical conduction lines 75 from breaking under stress or coming loose from the connection with the submersible module 30 or the electronic controls within the buoyant housing 100. However, other embodiments may simply use the electrical conduction lines 75 and would not use an elongate member or cable 80. The elongate member or cable 80 could be comprised of typical fishing line material, metal, plastic, string, or any type of fiber. It should be noted that the elongate member or cable is not required. Some embodiments may use only the conduction lines 75. Other, stronger materials may be used when only conduction lines 75 are used. Thus, any relatively strong and conductive material can be used as the conduction lines 75 so that the elongate member or cable is not required, including but not limited to: any type of metal (including steel, composite metals, titanium, etc.), conductive fibers, or conductive composite materials.

The connection between the electrical conduction lines 75 and the electronic controls 825 (ex. microcontroller) or power source 820 within the buoyant housing 100 can take many forms. The components can of course be hard-wired together. Alternatively, the controls 825 may be hard wired into a connector which is attached to the buoyant housing 100 where a mating connector can be attached to the end of the electrical conduction lines 75. This allows for the electrical conduction lines 75 to be removably connected to the electronic 825 controls so that several different types of submersible modules 30 can be used with a single buoyant housing 100. It also allows a damaged submersible module 30 to be replaced without having to replace all of the components within the buoyant housing 100.

The submersible module 30 used in this embodiment contains an electric motor (not shown) surrounded by an encasement material 31 (typically a plastic, rubber, elastomer, any type of organic material, any combination of these, or a similar type of material). In this embodiment, the electric motor is connected to a propeller 36 which provides a means for propelling the submersible module 30 to move within the water. FIG. 1 shows an embodiment where the propeller 36 is placed near the rear portion (tail) of the submersible module 30. However, as discussed below, the propeller 36 could also be placed near the front portion (nose) of the submersible module.

Figure 9C:
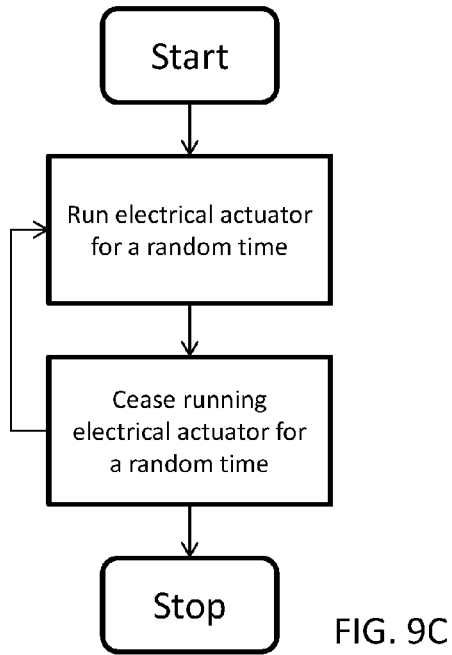
Figure 9D:
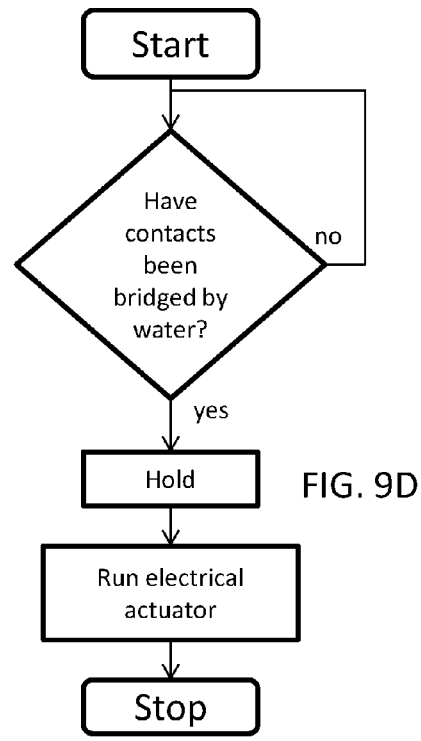

Depending on the particular embodiment and the sophistication of the electronic controls 825 in the buoyant housing 100, the propeller 36 may cycle on/off, (see FIG. 9A), remain on constantly while in the water (see FIG. 9B), or may even perform a completely random type of on/off behavior (see FIG. 9C). As known in the art, a hook 35 preferably extends outwardly from the submersible module 30 in order to secure the submersible module 30 within the target fish once they attempt to bite or eat the submersible module 30.

The top 110 of the buoyant housing can provide a number of functions. In a preferable embodiment, the top 110 will provide an attachment point 109, or means for attaching the fishing line coming from the fisherman (possibly from the fisherman's reel/pole or any other type of handle or assembly being controlled by the fisherman). A typical means for attaching the fishing line may be a ring or other type of enclosed aperture. In some embodiments, the top 110 may provide access to the internal components of the buoyant housing 100. In an exemplary embodiment, the top 110 may contain a photovoltaic cell which can be used to power the electronic controls and the components of the submersible module 30. The buoyant housing 100 can take on many shapes and sizes depending on the particular application. If a photovoltaic voltaic cell is being used, the buoyant housing may be designed where the top 110 has a larger surface area to increase the power generation capability of the photovoltaic cell.

By separating the submersible module 30 from its power 820 and electronic controls 825 in the buoyant housing 100, each piece can be designed independently and is no longer dependant upon each other. Thus, large power sources and control assemblies can be used in combination with a very small submersible module. Because the design of the controls and power sources are not constrained by the space available within the submersible module, a large variety of designs and combinations are now available. Further, because the sensitive and expensive components can now be housed outside of the submersible module, they can be well-protected against damage and can even be used with a number of different submersible modules types (or multiple submersible modules at once) which may be designed specifically towards the target fish. When using multiple submersible modules with a single buoyant housing there may be a single power source and electronic controller in communication with several sets of conduction lines. Alternatively, there may be an independent power source for each set of conduction lines (and associated submersible modules).

In some embodiments, the controls 825 within the buoyant housing 100 can be programmed for a single operating cycle of the submersible module. In these embodiments, a user may have several different types of buoyant housings where each one is devoted to a specific operating cycle. In other embodiments, the controls 825 may be programmed for a plurality of different operating cycles where the user can select the precise operating cycle depending on the conditions and the particular target fish. The user could select the desired operating cycle by a knob or switch that could be either attached to the exterior of the buoyant housing 100 or placed within the buoyant housing 100 so that it can only be accessed by opening the housing. Similarly, the on/off switch for the device could be placed on the exterior of the buoyant housing 100 or may be accessed within the interior by removing the end cap 200. Other embodiments may allow the end cap 200 to thread into the buoyant housing 100 such that a certain amount of linear translation causes the battery contacts within to connect and power on the device. In other words, screwing the end cap 200 into the buoyant housing 100 causes the device to turn on while unscrewing the cap 200 from the buoyant housing 100 causes the device to turn off.

The electronic controls 825 can comprise any type of microcontroller, CPU, or microprocessor. Examples include, but are not limited to: Field-programmable gate array (FPGA), field-programmable analog array (FPAA), application-specific integrated circuit (ASIC), programmable read-only memory (PROM), programmable logic devices (PLDs), complex programmable logic device (CPLD), and any other electrical device which is capable of executing logic commands.

Figure 2:
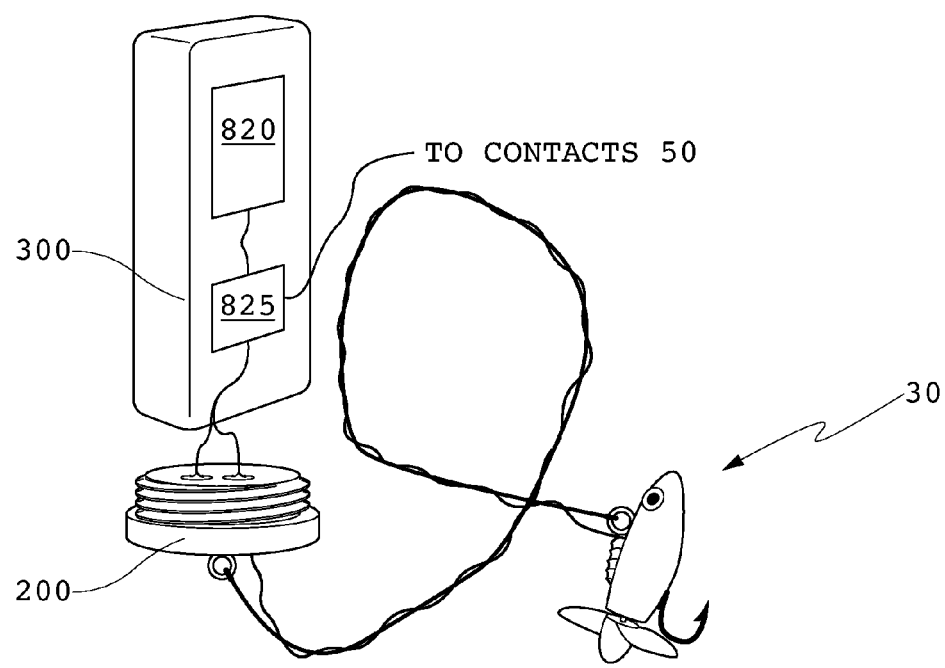
FIG. 2 is a side view of the embodiment from FIG. 1 where the power source and electronic controls have been removed from the buoyant housing.

FIG. 2 is a side view of the embodiment from FIG. 1 where the internal components 300 (ex. power source 820 and electronic controls 825) have been removed from the buoyant housing 100. For this embodiment, the internal components 300 are fastened to an end cap 200 which is removably attached to the buoyant housing 100. In this embodiment the end cap 200 is threaded into the buoyant housing 100 but it can be attached in any number of ways including but not limited to a snap-fit or by using a mechanical fastener to hold it in place. Of course, the buoyant housing 100 could comprise two halves which thread together along centerline 250. The buoyant housing 100 could also have any number of snaps or notches which allow it to open or close. Preferably, once assembled the buoyant housing 100 would be water-tight. In some embodiments, a gasket or other sealing means may be used along the mating edges of the buoyant housing components so that a water-tight seal can be maintained. Because the buoyant housing 100 is located at a distance away from where the target fish will be striking, it is in a relatively safe location. Further, it can take on shapes and sizes that are foreign to the native surroundings for the target fish but since it remains on the surface it should not alert the target fish to anything out of the ordinary. Also, the buoyant housing 100 can be constructed out of a very durable material (ex. metals, plastics, and/or composites) to further ensure that the internal components will not be damaged.

Some embodiments may also include a wireless receiver with the internal components 300. In these embodiments, a wireless transmitter may be operated by the user which may communicate with the wireless receiver which can in turn direct the electronic controls of the lure. Thus, the user may wirelessly select the mode of operation or manually energize the actuator within the submersible module 30. Of course, if feedback is desired a wireless receiver/transmitter can be used with the internal components 300 so that the electronic controls can not only accept instructions but may also provide feedback to the user.

Figure 3:
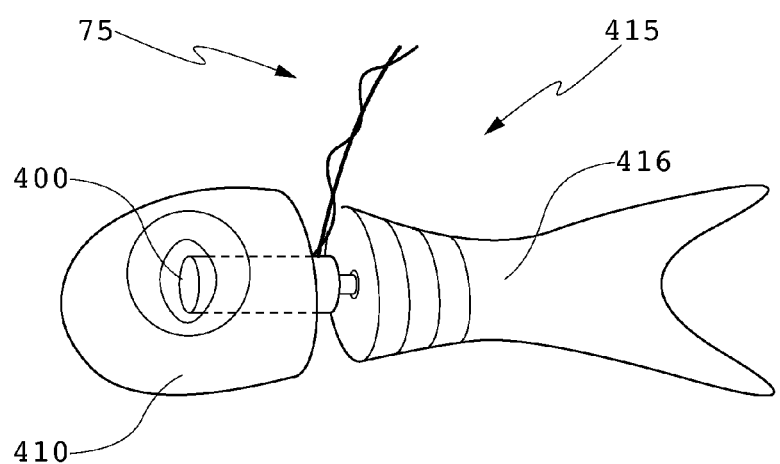
FIG. 3 is a side view of another embodiment for the submersible module.

FIG. 3 shows another embodiment for a submersible module 415. The conduction lines 75 are preferably in electrical communication with an electrical actuator 400 which is surrounded by the submersible module encasement 410. In this embodiment, the rear portion (tail) 416 is mechanically attached to the electrical actuator 400. In one example, the electrical actuator 400 may be an electrical motor where the rear portion (tail) 416 may be directly attached to the motor shaft so that the rear portion (tail) 416 simply rotates in a 360-degree pattern. In other examples, the rear portion (tail) 416 is mechanically attached to the electrical actuator 400 so that the rear portion (tail) 416 would move in a back-and-forth motion (similar to the natural swimming motion of fish) to provide a means for propelling the submersible module 415 through the water. This back-and-forth motion may be accomplished by many types of back-and-forth electrical actuators or by a linkage assembly placed between a rotational motor shaft and the attachment point for the rear portion (tail) 416.

Figure 4:
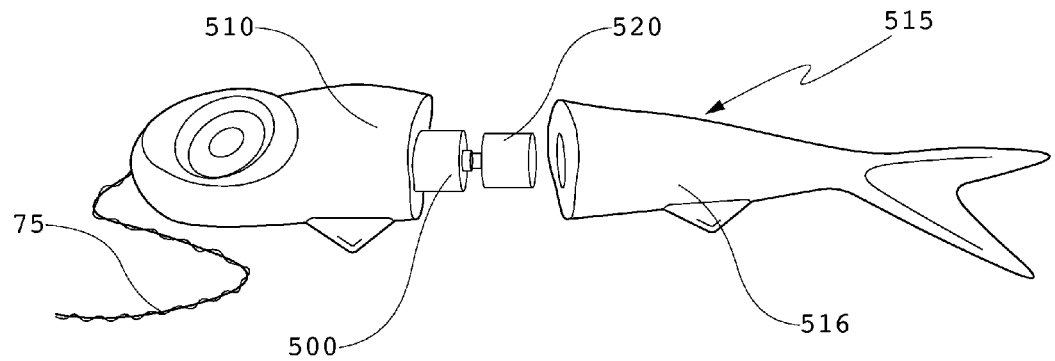
FIG. 4 is a side view of another embodiment for the submersible module prior to assembling the tail of the module to the motor shaft.

FIG. 4 shows another embodiment for a submersible module 515. The conduction lines 75 are preferably in electrical communication with an electrical actuator 500 which is preferably surrounded by the submersible module encasement 510. This figure shows an embodiment which uses a motor as the electrical actuator 500 and shows the attachment point 520 from the motor shaft prior to attaching the rear portion (tail) 516. In this embodiment, the rear portion (tail) 516 simply attaches directly to the attachment point 520 which is directly attached to the output shaft of the motor 500 so that the rear portion (tail) 516 would simply rotate 360 degrees to provide a means for propelling the submersible module 515 through the water.

Figure 5:
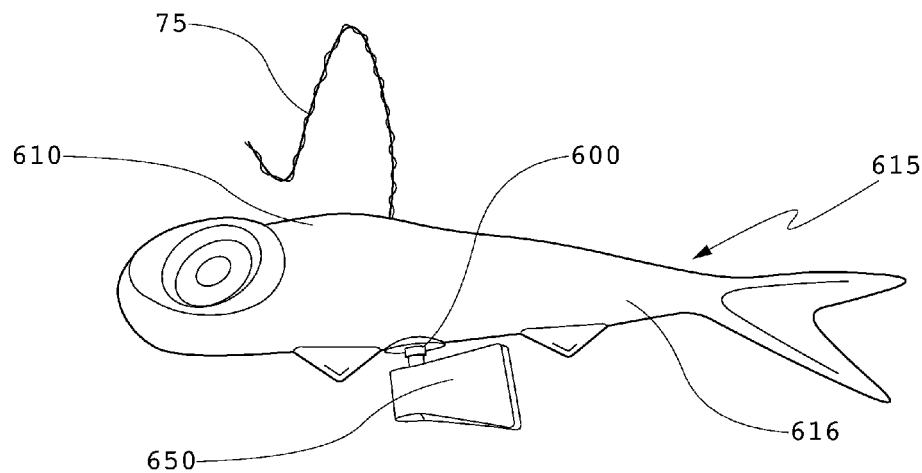
FIG. 5 is a side view of another embodiment for the submersible module where the electrical actuator is attached to a fin element.

FIG. 5 shows another embodiment for a submersible module 615. The conduction lines 75 are preferably in electrical communication with an electrical actuator 600 which is preferably surrounded by the submersible module encasement 610. In this example, the submersible module encasement 610 is a continuous piece which includes the rear portion (tail) 616. Here, a fin element 650 is attached to the electrical actuator 600. In this embodiment, the fin element 650 may oscillate back-and-forth or may continuously rotate 360 degrees. In other embodiments, the fin element 650 may be placed near the rear portion (tail) 616 or used in place of the rear portion (tail) 616. Here, the fin element 650 may provide the means for propelling the submersible module 615 through the water.

Figure 6:
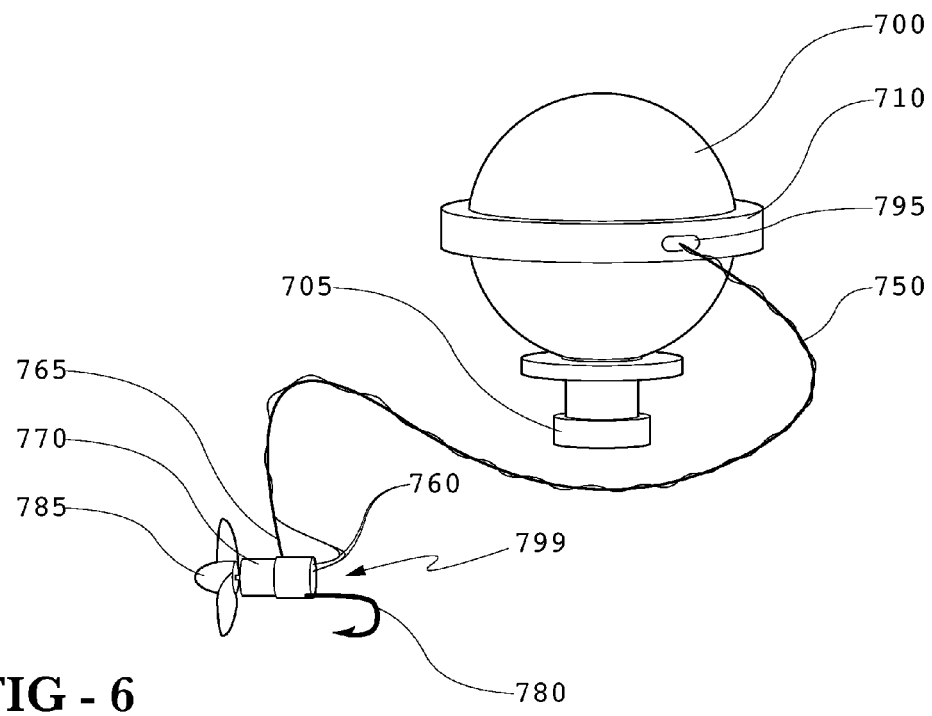
FIG. 6 is a side view of an embodiment using a means for increasing/decreasing the free length of the conduction lines (and optional cable)

FIG. 6 provides a side view of an embodiment using a means 710 for increasing/decreasing the free length 750 of the conduction lines (and optional cable). In this particular embodiment, the elongate member or cable 765 and conduction lines 760 wrap circumferentially around the buoyant housing 700 so that the length of cable and conduction lines between the buoyant housing 700 and submersible module 799 may be increased/decreased. The length of cable and conduction lines between the exit aperture 795 in the buoyant housing 700 and the submersible module 799 may be referred to as the free length 750.

In this embodiment, an end cap 705 is used to enclose the buoyant housing 700. The end cap 705 may provide access to the interior of the buoyant housing 700 such that batteries could be inserted/replaced, the power switch could be accessed (if placed in the interior of the buoyant housing 700), the operation mode of the submersible module 799 could be modified (i.e. speed, delay, on/off cycle time, etc.), or any other actions which require access to the interior of the buoyant housing 700. The end cap 705 could be attached in a number of different ways, including but not limited to: corresponding threads in the end cap 705 and buoyant housing 700, snap-fit, or mechanical fasteners. It is preferable that the end cap 705 provides a water-tight seal with the buoyant housing 700. A gasket may be placed between the interfacing surfaces of the buoyant housing 700 and end cap 705 to ensure a water-tight seal. Alternatively, the end cap 705 may not be designed for removal by the end user.

Here, the conduction lines 760 provide electrical communication with an electrical actuator 770 which has a hook 780 attached thereto. The cable 765 may be attached to the hook 780 or the electrical actuator 770. In an exemplary embodiment, the electrical actuator 770 is provided as an electric motor having a propeller 785 attached to the motor drive shaft. The propeller 785 is attached near the front portion (head) of the submersible module 799. Thus, the propeller 785 pulls the submersible module 799 from the front portion (head); providing a means for propelling the submersible module 799 through the water.

Figure 7:
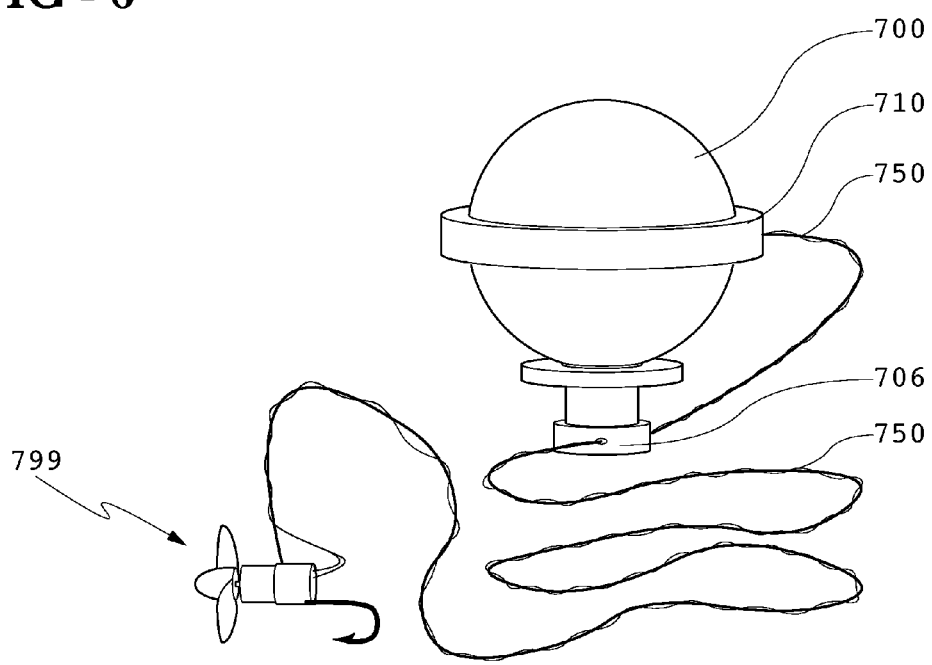
FIG. 7 is a side view of an embodiment using a means for increasing/decreasing the free length of the conduction lines (and optional cable) where the conduction lines (and optional cable) have been routed through a guide below the buoyant housing.

FIG. 7 provides a side view of an embodiment using a means 710 for increasing/decreasing the free length 750 of the conduction lines (and optional cable) where the conduction lines (and optional cable) have been routed through a guide 706 below the buoyant housing 700. In this view, the free length 750 of the conduction lines (and optional cable) has been extended so that the submersible module 799 may reside at a lower depth once cast into place. The guide 706 may be incorporated into the end cap 705 or may be a separate element. The guide 706 may allow the buoyant housing 700 to remain more vertical once cast into place and/or while reeling in a target fish.

Figure 8A:
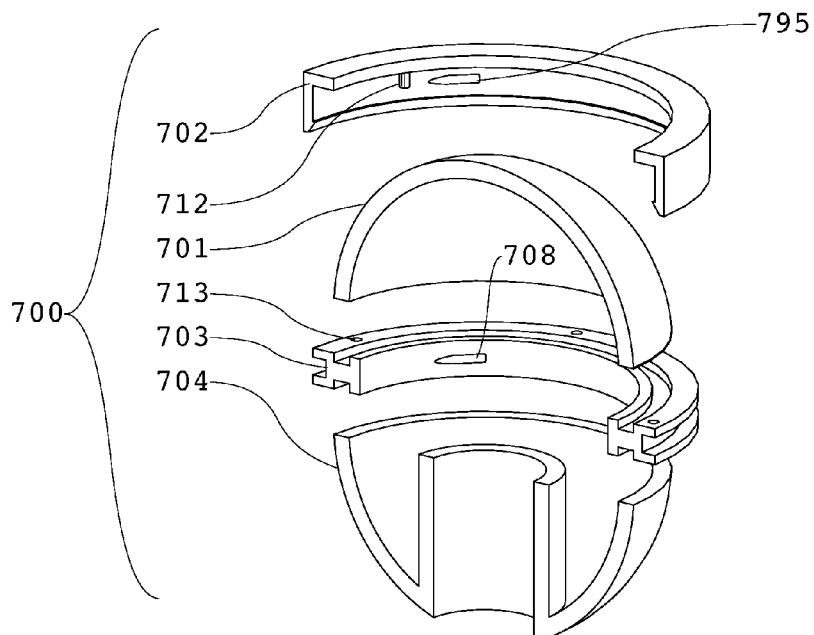
FIG. 8A is an exploded sectional view of a means for increasing/decreasing the free length of the conduction lines (and optional cable)

FIG. 8A provides an exploded sectional view of a means for increasing/decreasing the free length of the conduction lines (and optional cable). In this embodiment, an inner ring 703 is placed between a top portion 701 and a bottom portion 704. For this particular embodiment, the inner ring 703 may be a separate element which is sandwiched in between the top portion 701 and bottom portion 704. However, other embodiments may provide the inner ring as an integral portion of the top portion 701 or bottom portion 704. An outer ring 702 partially covers the top and outer circumferential portions of the inner ring 703. It is preferable that the outer ring 702 may be rotated relative to the inner ring 703 such that the angular relationship between the two rings can be adjusted by the user.

Once the desired angular relationship is selected (i.e. the free length of conduction lines and optional cable has been selected), a locating feature 712 within the outer ring 702 may interface with a corresponding locating feature 713 within the inner ring 703 so that the selected angular relationship may be (at least temporarily) fixed. While in this particular embodiment, the locating features 712 and 713 comprise a post and corresponding aperture, any number of locating features may be used. For example and not by way of limitation, a number of notches could be used which correspond with several protractions. Also, interfacing saw-tooth profiles can be placed on the interfacing portions of the inner ring 703 and outer ring 702. The outer ring 702 may be biased down onto the inner ring 703 to maintain the connection between the locating features but this may not be necessary. It has been found that the downward force on the outer ring 702 from the exiting conduction lines may adequately hold the outer ring 702 onto the inner ring 703 without any additional biasing.

Figure 8B:
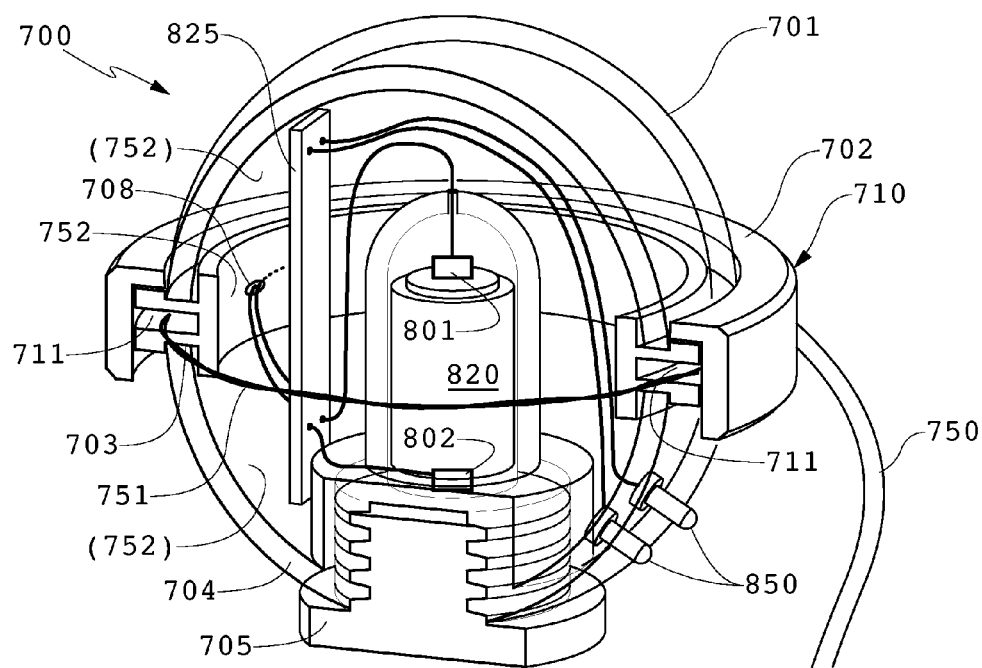
FIG. 8B is a sectional view of a means for increasing/decreasing the free length of the conduction lines (and optional cable).

FIG. 8B is a sectional view of a means for increasing/decreasing the free length 750 of the conduction lines (and optional cable). A channel 711 may be defined by overlapping portions of the inner ring 703 and outer ring 702 so that excess lengths 751 of the conduction lines (and optional cable) may wrap circumferentially around the housing 700 and stored within the channel 711. The conduction lines (and optional cable) may enter the interior of the housing through aperture 708 within the inner ring 703. Once inside, the conduction lines (and optional cable) should preferably be fixed relative to the inner ring 703. The conduction lines may have a strain relief type attachment prior to continuing to connect with the power source or electronic controls or may simply connect directly to the power source or electronic controls. A strain relief type attachment may fasten to the interior wall 752 of the inner ring 703 or to the interior portion (752) of the upper portion 701 or lower portion 704. If the optional cable is used, it may be fastened to the interior wall 752 of the inner ring 702 or to the interior portion (752) of the upper portion 701 or lower portion 704.

The excess conduction lines (and optional cable) 751 may exit the channel 711 by passing through exit aperture 795 in the outer ring 702 portion of the buoyant housing 700. By adjusting the angular relationship between the outer ring 702 and the inner ring 703, more excess conduction lines (and optional cable) 751 may be drawn out of the channel 711. The opposite would apply in order to shorten the free length 750 or increase the amount of excess conduction lines (and optional cable) 751 within the channel 711.

Other embodiments may allow the end cap 705 to thread into the buoyant housing 700 such that a certain amount of linear translation causes the battery contacts 801/802 within to connect and power on the device. In other words, screwing the end cap 705 into the buoyant housing 700 causes the device to turn on while unscrewing the cap 705 from the buoyant housing 700 causes the device to turn off.

It has been found that the buoyant housing may be sized according to the type of submersible module being used and the desired performance of the submersible module. For example, in some embodiments where the buoyant housing is relatively large, the submersible module and motor may not be capable of moving the buoyant housing through the water and thus the location of the submersible module and motor are relatively constrained to the location of the buoyant housing. When fishing in tight locations, this type of orientation may be desirable as the submersible module may be constrained to the immediate area surrounding the buoyant housing. However, in other situations it may be desirable to allow the submersible module to pull the buoyant housing through the water into different locations. In these embodiments, the buoyant housing would be sized smaller so that it may be moved by the submersible module.

Although an embodiment may be shown and described with conduction lines and an electrical actuator, fluid lines and a hydraulic/pneumatic actuator could be substituted by one of skill in the art.

While certain embodiments of the present invention are described in detail above, the scope of the invention is not to be considered limited by such disclosure, and modifications are possible without departing from the spirit of the invention as evidenced by the following claims:

What is claimed is:

1. A fishing lure comprising:
a buoyant housing having a bottom portion;
a power source in electrical communication with an electronic controlling element where the power source and electronic controlling element are placed within the buoyant housing;
a pair of conduction lines in electrical communication with the electronic controlling element; and
a submersible module comprising:
an electrical actuator in electrical communication with the conduction lines, and
a means for propelling the submersible module through the water, said means attached to the electrical actuator;
a hook extending from the submersible module;
a pair of contacts on the bottom portion of the buoyant housing and in electrical communication with the electronic controlling element such that the power source is energized when the contacts are bridged by water; and
wherein the electronic controlling element controls the operation of the electrical actuator.

2. The fishing lure of claim 1 further comprising:
a means for attaching fishing line to the buoyant housing.

3. The fishing lure of claim 1 further comprising:
encasement material surrounding at least a portion of the electrical actuator.

4. The fishing lure of claim 1 wherein:
the electrical actuator is an electric motor.

5. The fishing lure of claim 4 wherein:
the means for propelling the submersible module through the water comprises a propeller.

6. The fishing lure of claim 1 wherein:
the power source is a battery.

7. The fishing lure of claim 1 wherein:
the electrical actuator is an electric motor with a drive shaft which is surrounded by encasement material to define a head portion of the submersible module; and
the means for propelling the submersible module through the water comprises encasement material which is attached to the drive shaft to define a tail portion of the submersible module.

8. The fishing lure of claim 1 further comprising:
an opening within the buoyant housing; and
an end cap which fits within the opening of the buoyant housing.

9. A fishing lure comprising:
a buoyant housing having a top portion and bottom portion;
an inner ring having an aperture passing through it, said inner ring being sandwiched in between the top and bottom portions of the buoyant housing;
an outer ring that covers at least a portion of the inner ring to define a channel, the outer ring having an aperture passing through it;
a power source and electronic controlling element placed within the buoyant housing;
a pair of conduction lines in electrical communication with the power source and fixed relative to the inner ring, said conduction lines passing through the aperture in the inner ring, wrapping around the channel to define an excess length, and passing through the aperture in the outer ring with the remaining length defining a free length;
a submersible module attached to the conduction lines and comprising:
an electrical actuator in electrical communication with the conduction lines;
a means for propelling the submersible module through the water, said means attached to the electrical actuator; and
a hook attached to the electrical actuator.

10. The fishing lure of claim 9 further comprising:
elements on the inner and outer rings which mate with one another such that the angular relationship between the rings can be altered.

11. The fishing lure of claim 9 further comprising:
a guide placed on the bottom of the buoyant housing which allows the conduction lines to pass through.

12. The fishing lure of claim 9 further comprising:
an opening within the buoyant housing; and
an end cap which fits within the opening of the buoyant housing.

13. The fishing lure of claim 9 wherein:
the electrical actuator is an electric motor;
the means for propelling the submersible module through the water comprises a propeller; and
the power source is a battery.

14. A fishing lure comprising:
a buoyant housing having a threaded opening and a bottom portion;
a battery with associated contacts placed within the buoyant housing;
an electronic controlling element placed within the buoyant housing and in electrical communication with the battery and associated contacts;
a pair of conduction lines in electrical communication with the electronic controlling element;
a submersible module having a front and rear portion comprising:
an electric motor in electrical communication with the conduction lines, said electric motor having a drive shaft oriented near the front of the submersible module;
a propeller attached to the drive shaft at the front portion of the submersible module;
a hook attached to the electric motor and placed at the rear portion of the submersible module;
a pair of contacts on the bottom portion of the buoyant housing and in electrical communication with the electronic controlling element such that the power source is energized when the contacts are bridged by water; and
a cap having threads corresponding to the threads in the opening in the buoyant housing such that the battery is engaged by the contacts when the cap is sufficiently threaded into the opening.

15. The fishing lure of claim 14 further comprising:
encasement material surrounding at least a portion of the electric motor.

16. The fishing lure of claim 1 wherein:
the electronic controlling element delays any movements by the electrical actuator until a certain amount of time has passed following the submersible module's entry into the water.

17. The fishing lure of claim 1 wherein:
the electronic controlling element cycles the electrical actuator on and off.

18. The fishing lure of claim 1 wherein:
the electronic controlling element cycles the electrical actuator in a random type of on and off behavior.

19. The fishing lure of claim 1 wherein:
the electronic controlling element directs the electrical actuator to remain on constantly after the pair of contacts on the submersible module has been contacted by water.

* * * * *